No. 729,426.                                                  Patented May 26, 1903.

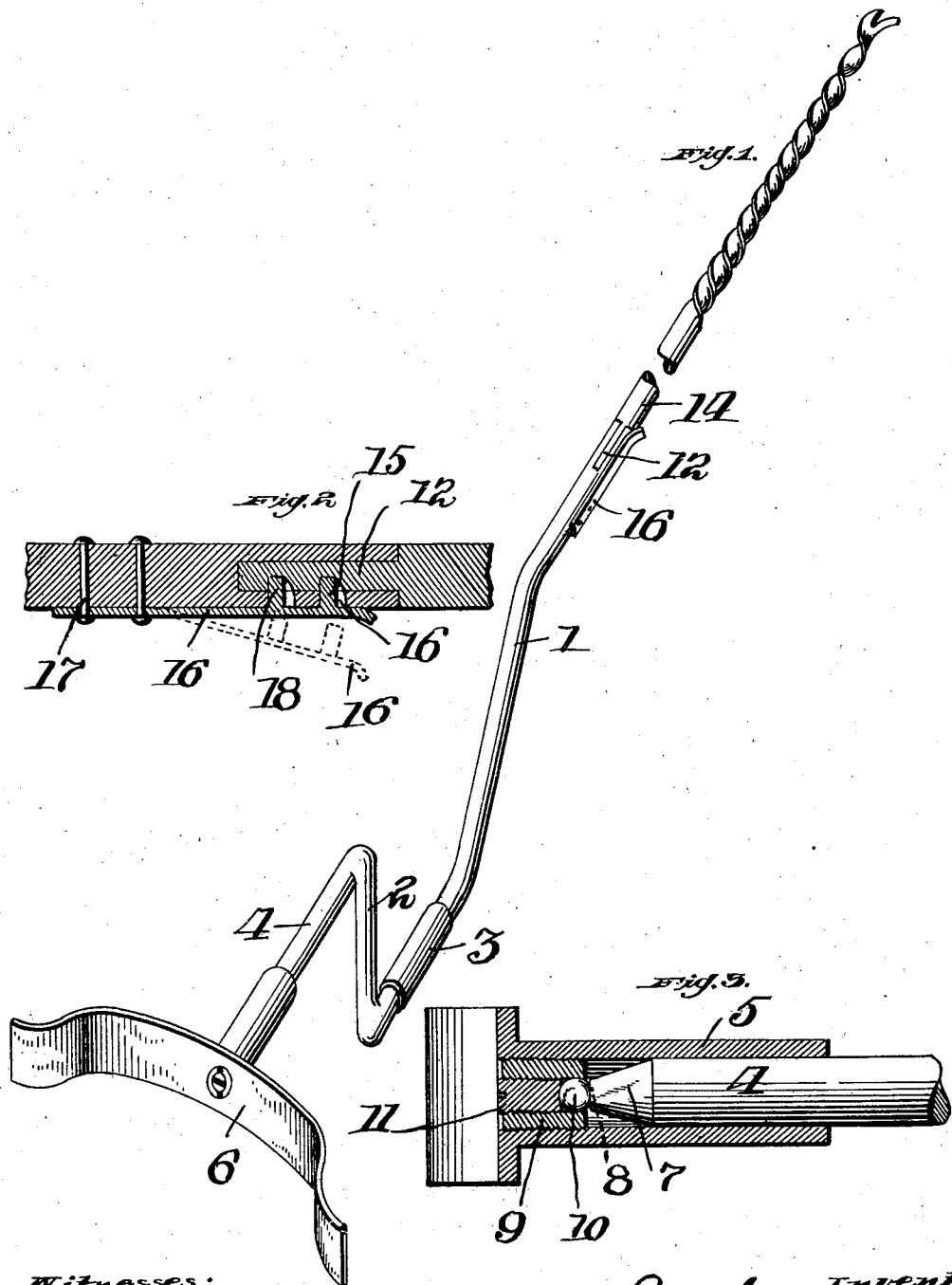

UNITED STATES PATENT OFFICE.

ZACCHEUS SCOTT, OF BLYTHESDALE, PENNSYLVANIA.

COAL-DIGGER.

SPECIFICATION forming part of Letters Patent No. 729,426, dated May 26, 1903.

Application filed September 8, 1902. Serial No. 122,540. (No model.)

*To all whom it may concern:*

Be it known that I, ZACCHEUS SCOTT, a citizen of the United States, residing at Blythesdale, in the county of Allegheny and State of Pennsylvania, have invented a new and useful Improvement in Coal-Diggers, of which improvement the following is a specification.

This invention relates to certain new and useful improvements in mining-augers, and principally that class which are employed in connection with the mining of coal.

The invention has for its object to improve devices of this character in respect to the means for securing the auger in position in the stem, whereby it is securely held and yet may readily be removed for the purpose of inserting another auger having a sharpened bit, and in improvements in the manner of mounting the stem, whereby the free movement of the latter is permitted and the friction reduced to a minimum.

With the above and other objects in view the invention consists in the novel construction, combination, and arrangement of parts, to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1 is a detail perspective view of my improved mining-auger, the shank of the auger being partly broken away. Fig. 2 is an enlarged longitudinal sectional view showing the manner of securing the auger in the stem. Fig. 3 is an enlarged longitudinal sectional view showing the manner in which the stem is mounted in its bearing.

In the accompanying drawings, 1 indicates the stem of the auger, which near its rear end is bent at right angles to form the crank 2, said stem being provided near this crank with a suitable hand-grip 3. Rearwardly-extending arm 4 of the stem fits into the extending barrel or sleeve 5, formed integral with the body-brace 6. This barrel or sleeve 5 forms a bearing in which the arm 4 revolves, said arm being tapered at its rear end and set in the form of a frustrated cone 7, and this cone is provided in its rear end with a groove or seat 8.

Placed in the rear end of the barrel or sleeve 5, and preferably threaded therein, is a bearing 9, bored to receive the ball 10, which seats in the recess 8 and in the end of the adjusting-block 11, which is threaded into the bearing 9.

The stem 1 at its forward end is bifurcated to receive the shank 12, made on the inner end of the auger 14. This shank fits within said bifurcated end of the stem 1 and is provided with recesses 15, which register with apertures 16, provided in one side of the bifurcated portion of the stem 1. A securing member 16' is securely riveted, as at 17, or otherwise fastened to the stem 1 and carries projecting pins 18, which protrude through the opening 16 and into the recesses 15 to hold the auger in position in the stem. This securing member is made of metal, which may be sprung outwardly, as shown in dotted lines in Fig. 2, in order that the auger may be disengaged therefrom and a sharpened one inserted in position. In this construction it will be observed that a new auger may readily be inserted in the stem, and by reason of the ball-bearing provided at the rear of the stem the friction is reduced to a minimum, permitting an easy operation of the device.

In practice it will be observed that various changes may be made in the details of construction without departing from the general spirit of my invention.

Having fully described my invention, what I claim as new, and desire to secure by Letters Patent, is—

In an auger of the type set forth, the combination with the stem, of the body-brace, a sleeve formed integral with the said brace, said sleeve having its outer end internally screw-threaded, an externally-screw-threaded bearing in threaded engagement with the threaded interior of the said sleeve, said bearing having a screw-threaded bore, an externally-screw-threaded adjusting-block arranged in the bore of the said bearing, and a ball arranged in the inner end of the said sleeve, and engaging the said block and stem, substantially as and for the purpose specified.

In testimony whereof I have hereunto signed my name in the presence of two subscribing witnesses.

ZACCHEUS SCOTT.

In presence of—
LOUIS MOESER,
M. HUNTER.